May 28, 1968  ISOKAZU TANAKA ET AL  3,386,075

SUPERSONIC WAVE RECORDING DEVICE

Filed Nov. 21, 1966

INVENTORS
ISOKAZU TANAKA
TOMIO HOTTA
ARAO TAKAO
BY
ATTORNEY

United States Patent Office 3,386,075
Patented May 28, 1968

3,386,075
SUPERSONIC WAVE RECORDING DEVICE
Isokazu Tanaka, Tokyo-to, Tomio Hotta, Kawaguchi-shi, and Arao Takao, Tokyo-to, Japan, assignors to Kabushiki Kaisha Koden Seisakusho, Shinagawa-ku, Tokyo-to, Japan, a company of Japan
Filed Nov. 21, 1966, Ser. No. 595,960
Claims priority, application Japan, Nov. 26, 1965, 40/72,200
2 Claims. (Cl. 340—3)

ABSTRACT OF THE DISCLOSURE

This invention relates to a supersonic device for the transmission and reception of supersonic pulses particularly useful for detecting configuration of the sea bottom, location of shoals and schools of fish and the like and embodies means for disconnecting the recorder from the receiver during a predetermined scanning angle.

This invention relates to a supersonic detecting device and more specifically to novel and improved apparatus including transducing means for transmitting and receiving supersonic signals, a rotatable support for said transducer to rotate it through a selected angle, a supersonic oscillator for feeding pulses of energy to the transmitter and a receiver connected to the transmitter for receiving reflected pulses of energy. The invention further involves means for gating the output of the receiver so that output pulses will be fed to the recording means only during selected angles when the gating means is actuated. The gating means is in turn operated by a suitable switching element operated in synchronism with the transducer and functions to operate the gate to pass signals to a recorder only during a selected angle of rotation.

Prior known devices utilizing supersonic waves for plotting sea bottoms, location of shoals and the like embodied means for emitting supersonic waves and detecting reflected waves while regularly rotating the transducer for transmitting and receiving supersonic signals. The received pulses were then recorded in terms of time and intensity, and such devices have generally been referred to as sonar equipment. In such prior known devices the specific relationship between a recorded pulse and the direction from which such pulse was received was not clear, and it was difficult to determine the precise configuration of the sea bottom, location of shoals, etc., from the recorded image. This invention overcomes the aforementioned difficulties with prior known devices and affords a novel and improved supersonic detecting device which affords means for readily determining the precise angle from which reflected waves are received and thus affords more accurate means for producing the configuration of the sea bottom, location of shoals, etc.

Another object of the invention resides in the provision of a novel and improved recording device characterized by its accuracy, ease of operation, and clear presentation of the recorded information.

The above and other objects of the invention will become more apparent from the following description and accompanying drawings forming part of this application.

Figure 1:
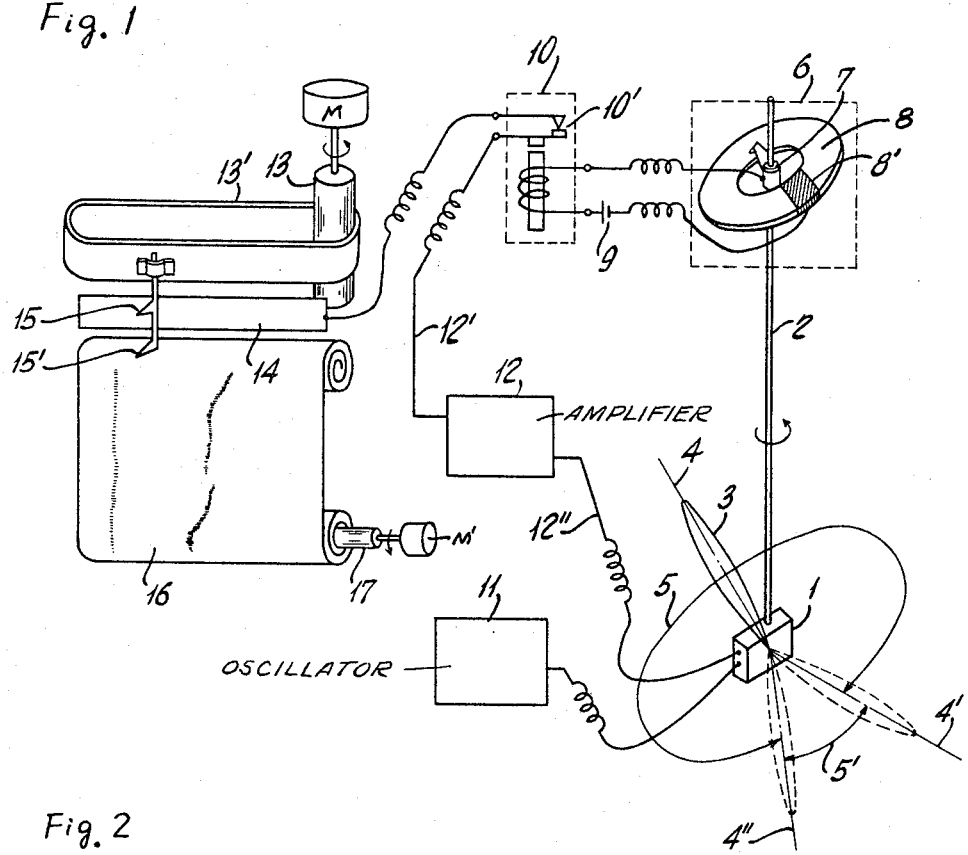
FIGURE 1 is a schematic diagram of a supersonic wave transmitting and detecting apparatus in accordance with the invention.

While the invention now to be described has general utility, it is particularly useful under water for the detection of submerged objects, the sea bottom, shoals, schools of fish and the like. Referring now to the drawings and more specifically to FIGURE 1, the transducer for transmitting and receiving supersonic signals is generally denoted by the numeral 1 and is mounted at the bow of a ship below the water line. The extension of the longitudinal axis of the ship is represented by the line 4 while the starboard and port sides of the ship are generally denoted by the lines 4' and 4", respectively. The transducer is designed to transmit and receive energy within a relatively narrow beam 3 and is carried by a rotatable shaft 2 that would normally be driven by a motor or other suitable means at a predetermined angular velocity. As will become apparent, suitable means may be coupled to the shaft 2 to oscillate the transducer through a predetermined angle instead of rotating it in a single direction.

It has been found that when a transducer is carried by a vessel more precise results can be obtained by eliminating undesired reflections that may be produced by the vessel itself. Accordingly, in the instant embodiment of the invention, the apparatus is arranged so that transmission and reception of signals occurs as the transducer 1 is rotated through the angle 5 and operation is interrupted as it moves through the reflex angle 5'. This is accomplished through the utilization of gating means comprising in the illustrated embodiment of the invention commutating means 6 and an electromagnetic relay 10. The commutating means comprises a fixed commutator 8 having a conductive segment 8' and a rotating contactor 7 carried by the shaft 2. The contactor 7 and the conductive segment 8' are connected through a battery 9 to a coil of the relay 10 so that as the contactor 7 rides over the conductive segment 8', it will operate the relay to open the normally closed contacts 10'. The commutator 8 is oriented with the vessel carrying the equipment so that operation of the device is interrupted as the transducer 1 moves through the angle 5'. While in the illustrated embodiment of the invention the contactor 7 is directly rotated by the shaft 2, it is quite evident that other means such as selsyn motors or the like may be utilized to effect rotation of the contactor 7 in synchronism with the transducer 1.

The supersonic pulses for transmission by the transducer 1 are generated by the oscillator 11 and fed to the transducer. The received energy is fed through the lead 12" to a receiver or amplifier 12. The output of the amplifier 12 is fed through the lead 12' to one of the contacts 10' of the normally closed relay 10. The other of the contacts 10' is connected to a conductive plate 14 forming part of the recording means.

The recording means includes a conductive stylus 15' having a contactor 15 which rides on the conductive plate 14. The stylus 15' rides on the surface of the recording paper 16 which is discolored by the stylus 15' when a suitable voltage is applied thereto. While the stylus 15' can be carried across the paper 16 by any desired means, in the illustrated embodiment of the invention the stylus 15' is supported by a belt 13' carried by a roller 13 rotated at a constant speed by the motor M. The paper 16 is fed at a constant rate by the roller 17 driven by a motor M'. While the stylus 15' is transported in a linear path across the paper 16, it is of course evident that it may be carried by a pivoted arm and moved through a slight arc across the recording paper 16.

With the appratus as described above the transducer will operate to transmit pulses from the oscillator 11 and feed reflected energy to the receiver 12 and thus to the recorder while moving through the angle 5. Assuming clockwise rotation of the transducer 1, when the transducer arrives at the starboard side of the vessel, represented by the line 4', the contactor 7 engages the segment 8' to operate the relay 10 and open the contacts 10' to interrupt the circuit to the recording stylus 15'.

When the transducer arrives at the line 4", the contactor 7 leaves the segment 8' causing the contacts 10' to close and reinitiate the recording operation. It is evident from the foregoing that any suitable gating means may be utilized in order to interrupt the recording operation or at least reduce the signal on the lead 12' to a negligible magnitude. For instance, electronic relays or gates utilizing transistors or the like may be employed.

Figure 2:
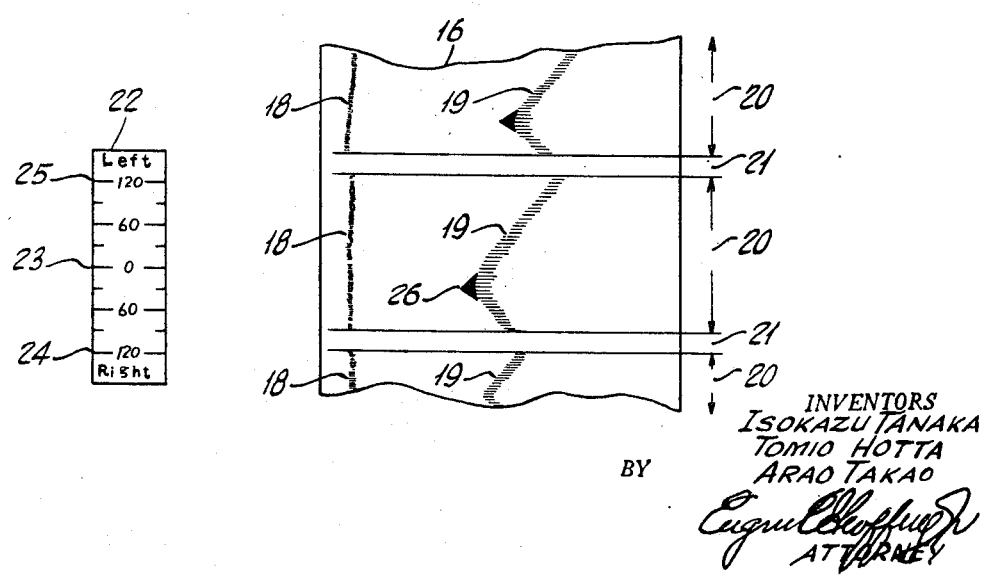
FIGURE 2 illustrates a recording in accordance with the invention and a scale for utilization with the recording.

FIGURE 2 illustrates a record produced by the apparatus shown in FIGURE 1. On the record 16, shown in FIGURE 2, the transmitted pulses denoted by the numeral 18 of relatively short duration, and the time interval between each of the pulses 18 is sufficient to permit the detection of the reflected signals. The reflected signals are denoted by the numeral 19, and the horizontal distance between each pulse 18 and the reflected pulse 19 affords an indication of distance. It will also be observed that the portions 20 of the record 16 represent recordings made during the travel of the transducer through the angle 5 while the portions 21 show that transmission and reception were interrupted during movement of the transducer 1 through the angle 5'.

In the example shown in FIGURE 2, the recordings 19 indicate an irregularity of the sea bottom and the irregularity may be coordinated with the position of the ship through the utilization of an appropriate scale such as the scale 22. By calibrating the scale with zero degrees at the center as indicated by the numeral 23 and then providing uniform graduations 25 for angles to the left of center and uniform graduations 24 for angles to the right of center, discontinuities in the sea bottom can be located relative to the longitudinal axis 4 of the vessel. For instance, the peaks 26 denoted in FIGURE 2 are located approximately sixty degrees in the direction of starboard.

In the illustrated embodiment of the invention the transducer 1 is rotated uniformly. It is evident, however, that the transducer may rotate through the angle 5 from starboard to port whereupon the recording operation would be interrupted while the transducer is rotated rapidly back through the same angle to starboard. When the transducer again moves through the counterclockwise angle recording is automatically initiated. In this case the gating means could be operated in response to the direction of rotation of the transducer 1 and thus automatically gate the signal as previously described.

While only certain embodiments of the invention have been illustrated and described, it is apparent that alterations, modifications and changes may be made without departing from the true scope and spirit thereof as defined by the appended claims.

What is claimed is:

1. A supersonic wave recording device comprising a supersonic transducer for transmitting and receiving supersonic waves and mounted for rotary movement in a plane, a supersonic oscillator connected with said transducer for transmitting energy pulses, a receiver connected to said transducer for amplifying reflected pulses of energy, means connected to the receiver to record said reflected energy pulses, the last said means including gating means operable to substantially interrupt the circuit between said receiver and recording means, means for periodically moving said transducer from a starting point through a selected angle and then returning to said starting point and means actuating said gating means to interrupt said circuit upon completion of movement through said selected angle and again actuating said gating means upon arrival at the starting point to re-establish said circuit and initiate recording.

2. A supersonic wave recording device according to claim 1 wherein said gating means comprises an electromagnetic relay having normally closed contacts connected to interrupt the circuit beween said receiver and recording means and said gate actuating means includes a commutator having at least one conductive segment, a contactor riding on said commutator and means including an energy source connecting said segment and contactor to said relay to open said relay contacts when the contactor is in contact with the segment, and wherein said means for periodically moving said transducer continuously rotates said transducer and said commutator in synchronism one with the other.

References Cited

UNITED STATES PATENTS 2,825,884    3/1958    Fryklund _____ 340—3

RICHARD A. FARLEY, *Primary Examiner.*